(12) United States Patent
Ebert et al.

(10) Patent No.: US 8,095,307 B2
(45) Date of Patent: Jan. 10, 2012

(54) METHOD FOR CONTROLLING THE DISPLAY OF A GEOGRAPHICAL MAP IN A VEHICLE AND DISPLAY APPARATUS FOR THAT PURPOSE

(75) Inventors: Andreas Ebert, Braunschweig (DE); Jens Fliegner, Wahrenholz (DE); Christoph Waeller, Braunschweig (DE); Lorenz Bohrer, Berlin (DE); Heino Wengelnik, Wolfsburg (DE); Joerg Lilienthal, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 866 days.

(21) Appl. No.: 11/919,626

(22) PCT Filed: Dec. 27, 2005

(86) PCT No.: PCT/EP2005/014073
§ 371 (c)(1),
(2), (4) Date: Jun. 27, 2008

(87) PCT Pub. No.: WO2006/117021
PCT Pub. Date: Nov. 9, 2006

(65) Prior Publication Data
US 2009/0048777 A1    Feb. 19, 2009

(30) Foreign Application Priority Data

Apr. 29, 2005   (DE) .......................... 10 2005 020 152

(51) Int. Cl.
*G01C 21/36* (2006.01)
*G09B 29/10* (2006.01)
*G08G 1/123* (2006.01)

(52) U.S. Cl. ................... 701/212; 701/211; 340/995.14; 345/660

(58) Field of Classification Search ................... 701/212, 701/209, 211, 208; 340/995.14; 382/276; 715/781; 345/660
See application file for complete search history.

(56) References Cited

U.S. PATENT DOCUMENTS

| | | | |
|---|---|---|---|
| 4,760,531 A * | 7/1988 | Yasui et al. .................... 701/200 |
| 5,945,927 A | 8/1999 | Nakayama et al. | |
| 6,282,490 B1 * | 8/2001 | Nimura et al. ........... 340/995.14 |
| 6,392,661 B1 * | 5/2002 | Tankersley .................... 345/660 |
| 6,445,999 B1 * | 9/2002 | Nakamura .................... 701/208 |

(Continued)

FOREIGN PATENT DOCUMENTS
DE            196 08 067          9/1997
(Continued)

OTHER PUBLICATIONS

International Search Report, PCT International Patent Application No. PCT/EP2005/014073, dated Apr. 19, 2006.

(Continued)

*Primary Examiner* — Tan Q Nguyen
(74) *Attorney, Agent, or Firm* — Kenyon & Kenyon LLP

(57) ABSTRACT

In a method for controlling a map display in a vehicle, a display device is controlled such that a section of a geographical map is displayed in a spatially non-linear scale. A display apparatus for displaying a geographical map includes a control unit and a display device, connected to the control unit, a map section, the control unit including an arithmetic-logic unit by which data assigned to the geographical map is able to be converted into display data, taking a spatially non-linear scale into consideration. A navigation system includes such a display apparatus.

23 Claims, 5 Drawing Sheets

U.S. PATENT DOCUMENTS

| | | |
|---|---|---|
| 6,853,386 B1 | 2/2005 | Keim et al. |
| 6,853,912 B2 * | 2/2005 | Han .............................. 701/208 |
| 7,743,337 B1 * | 6/2010 | Maeda et al. ................. 715/781 |

FOREIGN PATENT DOCUMENTS

| | | |
|---|---|---|
| DE | 197 33 650 | 2/1999 |
| DE | 101 41 507 | 3/2003 |
| DE | 103 09 194 | 10/2004 |
| DE | 103 20 530 | 11/2004 |
| EP | 0 793 074 | 9/1997 |
| EP | 1 288 627 | 3/2003 |
| FR | 2 720 533 | 12/1995 |
| JP | 2-10216 | 1/1990 |
| JP | 2-61690 | 3/1990 |
| JP | 6-273184 | 9/1994 |
| JP | 9-44085 | 2/1997 |
| JP | 9-197961 | 7/1997 |
| WO | WO 01/71484 | 9/2001 |

OTHER PUBLICATIONS

Written Opinion of the International Searching Authority, PCT International Patent Application No. PCT/EP2005/014073, dated Apr. 19, 2006 (English-language translation provided).

* cited by examiner

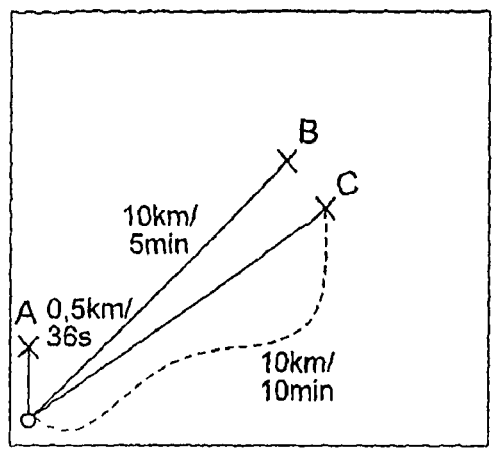
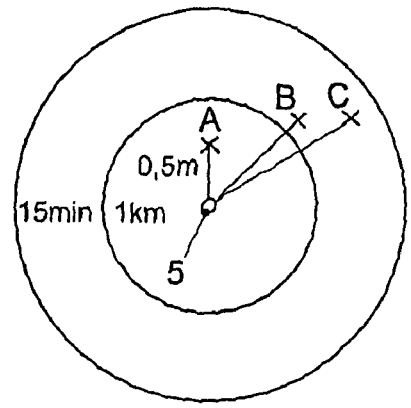
FIG. 5a  FIG. 5b
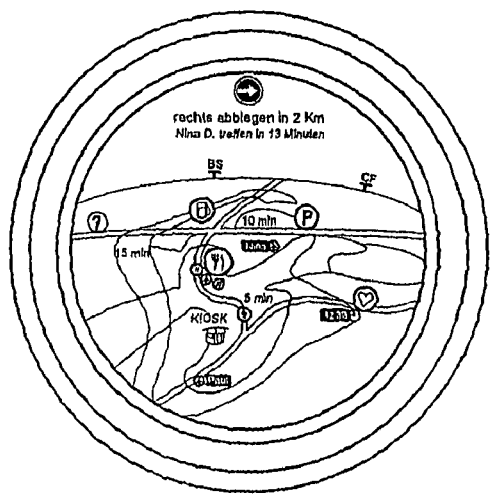
FIG. 6

METHOD FOR CONTROLLING THE DISPLAY OF A GEOGRAPHICAL MAP IN A VEHICLE AND DISPLAY APPARATUS FOR THAT PURPOSE

FIELD OF THE INVENTION

The present invention relates to a method for controlling the display of a geographical map in a vehicle, in which a display device is controlled such that a section of a geographical map is displayed. The present invention also relates to a display apparatus for displaying a geographical map, having a control unit and a display device, connected to the control unit, for displaying a map section, the control unit including an arithmetic-logic unit by which data assigned to the geographical map is able to be converted into display data, taking a scale into consideration. The present invention also relates to a navigation system including such a display apparatus.

BACKGROUND INFORMATION

In the case of navigation systems in vehicles or for use in connection with vehicles, it is conventional to represent the present geoposition in the surround field of a geographical map. For example, in a navigation system, the scale selected for the representation of the geographical map may be a function of the speed driven, the type of road traveled, or a selection by the user.

German Published Patent Application No. 197 33 650 described representing both a general map and a detail map in a display apparatus for a navigation system.

SUMMARY

Example embodiments of the present invention provide a method and a display apparatus in which the representation of the geographical map is improved. In particular, the map representation should first of all be clear, and secondly should supply sufficient detail information in the surrounding area of the user. The intention is also to provide a navigation system having such a display apparatus.

According to the method, a section of a geographical map is shown in a spatially non-linear scale. In the customary map representation in a linear scale, the relation of the distances of any points corresponds to the relation of the actual geopositions which are assigned to these points. According to example embodiments of the present invention, when displaying a map section, the map is at least not displayed in a linear scale over the entire display. Spatially non-linear scale should be understood to mean that it does not hold true for each combination of two stretches on the displayed map that the relation of the lengths of the stretches corresponds to the relation of the actual geographic stretches. In addition, it is possible that the representation is not isogonal either. For example, distortions can take place toward the horizon.

For instance, the map section may be subdivided into at least two areas, the two areas being displayed in different linear scales. In so doing, the displayed map section should merge continuously at the boundary between the two areas. If there is a preferential position in the displayed map section like, for example, the geoposition of the user, a smaller, that is, a more detailed map scale is displayed in the vicinity of this preferential position than in areas remote from the preferential position. The combination of areas having the different linear map scales provides that details can be recognized close to the preferential position, however the overall view is also maintained because of the coarser map scale in remote positions. In this case, it is not necessary to display two separate maps having different scales. In the method hereof, the different scales are integrated in one map. It is also not necessary that the user, by altering the linear scale, zoom into or out of the map in order to better recognize details in his/her vicinity or to achieve a better overall view in a coarser scale.

The map section may be selected by a navigation system. In this case, the preferential geoposition may be the present geoposition of the user ascertained by the navigation system. Furthermore, the preferential geoposition may also be a geoposition selected via the navigation system. For example, it may be the point of destination of a route guidance or a point of interest stored in the navigation system.

Spatial scales are displayed which show how far away geopositions are from each other spatially.

The anticipated time to get from one geoposition to another may be calculated, and the map section or at least an area of the map section may be displayed in a temporal scale in which the time to get from one geoposition to another is represented. In the representation of a temporal scale, the relation of the displayed lengths of two stretches corresponds to the relation of the anticipated time intervals in order to get from the starting points to the terminal points of the stretches.

The representation of temporal scales provides that, in many cases, such a display comes closer to the perception of the user than the display in a spatial, metric scale in which the distance of a point to the vehicle is a function of the distance in meters in reality. Namely, often the user is less interested in how far away a specific point is, than how much time is needed to reach a point. The latter information is clarified better for the user in a representation in a temporal scale. In this context, the more time is needed to reach a point, the further away this point in the map is from the position of the user or from another preferential position.

A combination of spatial and temporal scales may be displayed. In so doing, an area remote from the present geoposition of the driver is represented in a temporal scale. The outer area of the map section is therefore represented in a temporal scale.

The scale of the map section may change continuously. Thus, a so-called sliding scale is used. The map section or at least an area of the map section may be displayed in a logarithmic scale. The logarithmic representation may be preferred in the outer edge zones of the map section. In this manner, further distant and therefore less important details are pushed even further to the edge of the display, while more space remains for nearer and therefore potentially more important information. Floating transitions may be selected between different scales in the display of the map section. In so doing, between two zones, a transition region is defined in which the scale changes in floating fashion from the scale of the one zone to the scale of the other zone.

The anticipated time intervals to get from the geoposition of the user to other geoposition represented in the map section may be calculated. The time intervals are assigned to a plurality of time zones, and the time zones are represented in the map section in a manner distinguishable from one another. In this manner, a user is able to very easily and quickly understand the distance in time between two locations. An advantage in such a display is that temporal distances are represented in spatial map views. A possible menu navigation for the display of the distance in time or to indicate temporal distances from an object may be omitted in this representation. In this context, the time zones correspond to a degree of precision of the human perception of time in everyday life. When used in a navigation system, the remaining travel time to a destination is visible at a glance in the map view.

The anticipated time variance from a route may be calculated for at least a portion of the geopositions represented in the map section, the time variances may be assigned to a plurality of time zones, and the time zones may be distinguishably represented in the map section. By this type of representation, the duration of detours from a predefined route can become visible by a glance at the map view. The intuitive decision to deviate from a predefined route in order to stop at other destinations spontaneously is thereby facilitated.

The various time zones may be represented coded in color.

Prominent geopositions that are not in the map section displayed may be selected and represented at the edge of the map section. In so doing, the size, the transparency and/or the color of the representation of the geopositions represented at the edge of the map section may be a function of the distance from the present geoposition of the user. The long-distance orientation of the user may thereby be improved considerably.

In the display apparatus, the scale may be spatially non-linear. The map section may be subdividable into at least two areas by the arithmetic-logic unit, and display data is able to be calculated with different linear scales for the two areas. In so doing, the arithmetic-logic unit may calculate the display data such that the displayed map section merges continuously at the boundary of the two areas.

The scale of the map section may change continuously, or the map section or at least an area of the map section may be displayed in a logarithmic scale.

The navigation system includes the display apparatus described above. In particular, the anticipated time to get from one geoposition to another is able to be calculated by the navigation system. The display data is able to be calculated by the arithmetic-logic unit such that the displayed map section, or at least an area of the map section is displayed in a temporal scale in which the time to get from one geoposition to another is represented.

Moreover, the anticipated time intervals to get from the present geoposition to other geopositions represented in the map section are able to be calculated by the navigation system. The display data is able to be calculated by the arithmetic-logic unit such that the time intervals are assigned to a plurality of time zones which are represented in the map section in a manner distinguishable from one another.

The anticipated time variance from a route is able to be calculated by the navigation system for at least a portion of the geopositions represented in the map section. In this case, the display data is able to be calculated by the arithmetic-logic unit such that the time variances are assigned to a plurality of time zones which are represented in the map section in a manner distinguishable from one another.

Prominent geopositions outside of the map section to be represented may be determinable using the navigation system. The display data is able to be calculated by the arithmetic-logic unit such that these specific geopositions are represented at the edge of the map section.

Example embodiments of the present invention are explained in more detail below with reference to the appended Figures.

BRIEF DESCRIPTION OF THE DRAWINGS

FIG. 5a shows a conventional representation of a map in a linear spatial scale, and FIG. 5b shows a representation according to an exemplary embodiment of the present invention, in which the inner area is represented in a linear scale and the outer area is represented in a temporal scale.

FIG. 6 shows a representation in a navigation system, in which prominent locations are represented on the horizon.

DETAILED DESCRIPTION

Figure 1:
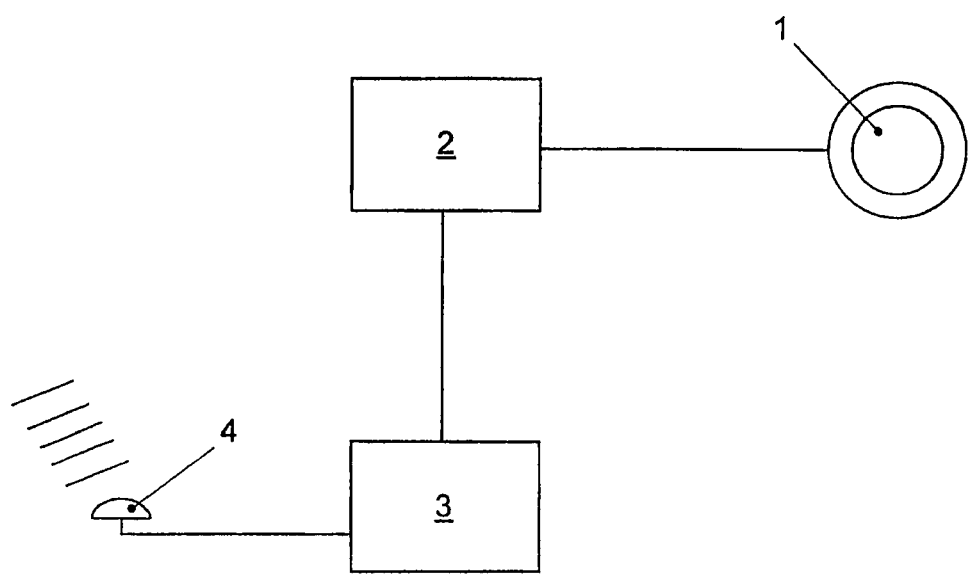
FIG. 1 shows a navigation system according to an example embodiment of the present invention, which includes a display apparatus.

The display apparatus includes a display device 1 and a control unit 2 connected to it. Display device 1 includes a display which, in the present case, is disk-shaped. Other shapes such as a square, rectangular or elliptical display are also possible. Display 1 may be a conventional liquid crystal display for two-dimensional images or another appropriate display device suitable for use in a motor vehicle. In addition, however, display 1 may also be designed for the autostereoscopic, three-dimensional representation of images. In order to attain the autostereoscopic effect, for example, a mask may be disposed in front of a conventional liquid crystal display, the mask altering the light emission of the light radiated from the liquid crystal display such that autostereoscopic images are able to be represented. For instance, the mask is a wavelength-selective filter mask or an optical structural mask. The mask makes it possible for one to differentiate between partial images which belong to different views, and each view is radiated in a different direction. Partial images may thus be separated for the right and for the left eye. When looking at display 1, the partial images are able to be combined to form one three-dimensional view. No further auxiliary aids such as glasses, etc., are necessary for this purpose. Reference is made to German Published Patent Application No. 103 09 194 and German Published Patent Application No. 103 20 530 with regard to further details of autostereoscopic display 1.

Control unit 2 includes an arithmetic-logic unit which converts data belonging to geographical maps into display data that corresponds to a representation in a spatially non-linear scale. The kind of representation in the spatially non-linear scale is explained in more detail below.

The display apparatus is connected to a navigation system 3 or is part of this navigation system. Navigation system 3 is connected to a receiver 4 for positional data radiated from satellites. It may be a GPS (global positioning system) receiver. Other satellite navigation systems, including the future Galileo system, could be used as well. In addition, it is possible to combine navigation system 3 and control unit 2 with the arithmetic-logic unit in one device.

In the following, the various examples of the representation on the display of display device 1 are explained. The data for this display is calculated by the arithmetic-logic unit and transmitted to display device 1.

In an exemplary embodiment, two linear spatial scales are combined with each other. The map is arranged around a preferential geoposition 5. For example, this is the present location of the display apparatus, that is, of the vehicle in which this display apparatus is installed. Around preferential geoposition 5, a smaller map scale is selected in which the distance of preferential geoposition 5 up to the boundary of the area having this map scale is 1 km. In an outer area, a larger scale is selected, so that the distance from preferential geoposition 5 to the outer boundary ring of this area corresponds to 5 km, i.e., the distance between the boundary rings corresponds to 4 km. It is also possible to use more than two linear scales which, in particular, extend in ring-like fashion around preferential geoposition 5. The position of the boundaries between the individual scales is also variable.

The map section merges continuously at the boundary line between the two areas having different linear scales. However, the scale changes discontinuously. For this reason, on the whole a spatially non-linear scale is displayed, although linear scales are used in partial areas. However, the representation differs from two separate map representations having different scales, since the various scales are integrated in one map section in which a continuous connection is implemented at the boundary line.

Figure 2A:
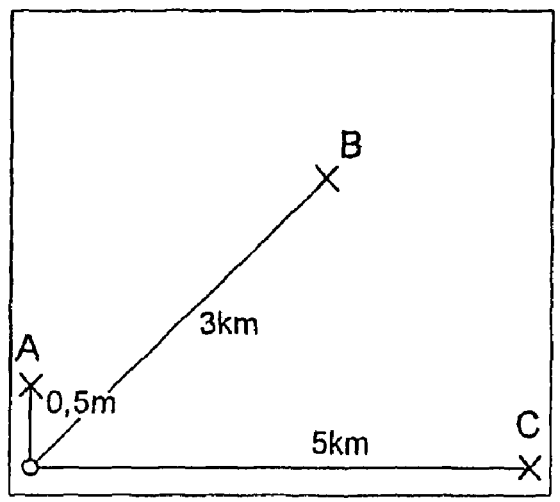
FIG. 2a shows a conventional display of a map section with a linear spatial scale.
Figure 2B:
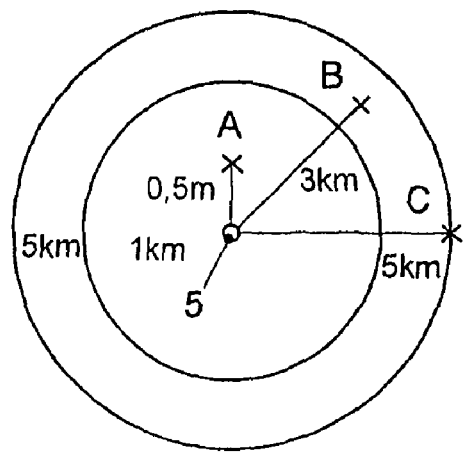
FIG. 2b shows an example for the representation of the map section according to an exemplary embodiment of the present invention, having two adjoining areas with different linear spatial scales.

The conversion of a conventional representation having a spatially linear scale into the representation hereof is clarified with reference to FIGS. 2a and 2b. FIG. 2a shows the conventional representation having a spatially linear scale. FIG. 2b shows the representation according to the method hereof or the display apparatus hereof.

A preferential geoposition 5 is determined as the midpoint of the map. In the example shown, this is the location of the vehicle. The angle and the distance to the map midpoint are calculated for each point of the map section. If the distance is less than the distance to the first scale boundary, i.e., 1 km in the example shown, then the point is converted and represented corresponding to the scale in this area. In so doing, the angles remain unchanged, as for all other points as well. In the figure, this case occurs at point A with 500 m distance from preferential geoposition 5. If the distance is between the first and second scale boundaries, the distance to the first scale boundary is subtracted. After that, the position of the point may be calculated. In the example, point B is 3 km away. The difference between the two scale boundaries is 4 km. If one subtracts the first scale boundary from the 3 km, B extends 2 km into the zone having the smaller scale, so that in the example of point B, it is represented exactly in the middle between the two scale boundaries. A third point C is 5 km away, and is therefore represented exactly on the second scale boundary. If the representation is made up of more than two scale zones, one proceeds in corresponding fashion with the others.

On the whole, the scale of the map displayed is spatially non-linear, since the relation, for example, of the stretch from preferential geoposition 5 to point A to the length of the stretch from preferential geoposition 5 to point B does not correspond to the relation of the actual geographical stretches.

Figure 3:
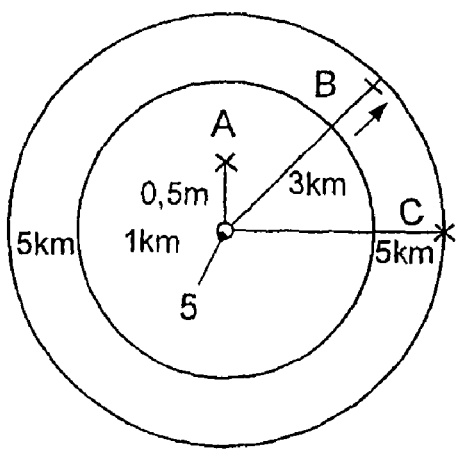
FIG. 3 shows a representation of the map section having an inner area with a linear scale and an outer area with a logarithmic scale.
Figure 4:
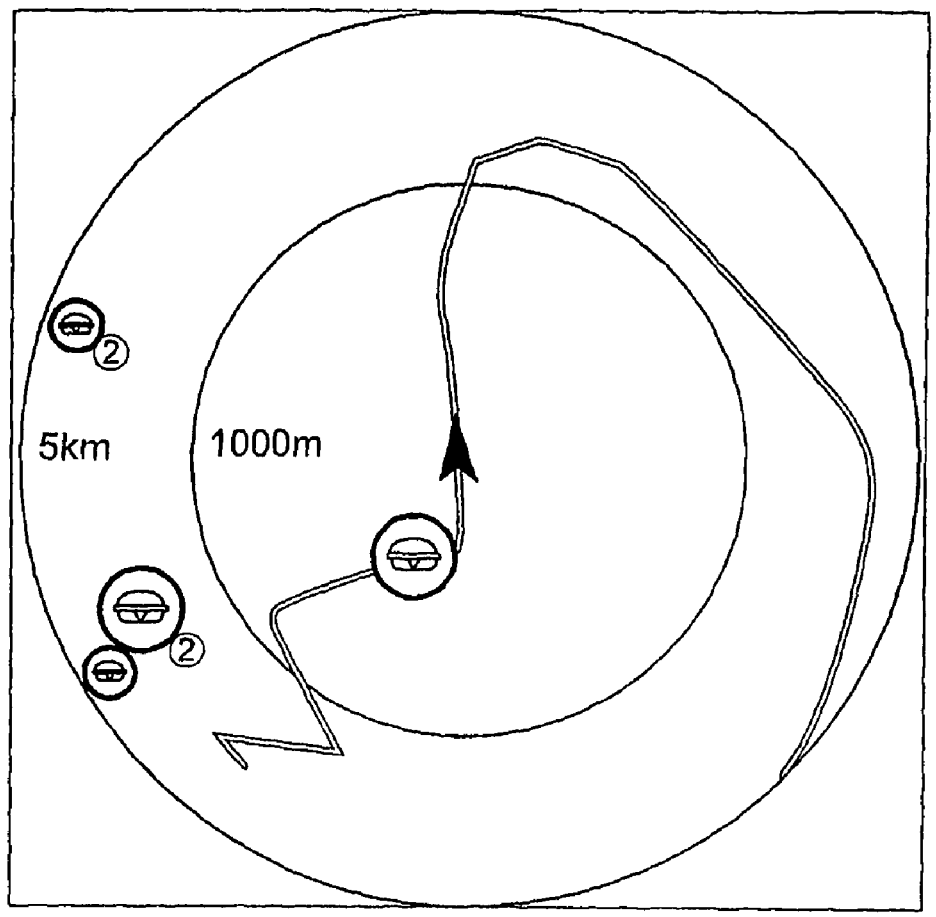
FIG. 4 shows a display corresponding to FIG. 3 in a navigation system, in which a route as well as points of interest are represented.

Correspondingly, FIGS. 3 and 4 illustrate another conversion of the conventional map representation which is shown in FIG. 2a. In this case, exactly as in FIG. 2b, a spatially linear scale up to a distance of 1 km is selected in the inner area. However, in the outer zone, which extends up to a distance of 5 km, a logarithmic scale is selected. Thus, point A remains unchanged, since it is within the area having the spatially linear scale. Point C also remains unchanged, since it is exactly on the outer area boundary. On the other hand, point B is shifted closer to the outer edge. The extent of the shift depends on the kind of logarithmic function selected.

FIG. 4 shows a display in a navigation system, the display using the scales shown in FIG. 3. In this case, a route guidance is represented on one hand. On the other hand, various points of interest are represented.

Moreover, it is possible to select floating transitions between the scales. In a transition region between two areas having different scales, the scale changes in floating fashion from the one scale into the other scale.

According to an exemplary embodiment, the map is displayed in a temporal scale in at least one area of the map section. The distance between two points in this area is therefore not a function of the spatial distance between the two geopositions, but rather the anticipated time to get from one point to another.

FIG. 5a again shows a conventional representation in a linear spatial scale. FIG. 5b shows the representation according to an example embodiment of the present invention, in which, as in the preceding exemplary embodiment, a linear scale up to a boundary of 1 km is selected in the inner area. In the outer area, however, a temporal scale up to a boundary of a time interval of 15 minutes is selected. In the following, the conversion of the representation shown in FIG. 5a to the representation of FIG. 5b is clarified.

Preferential geoposition 5, that is, the location of the vehicle, is fixed as the map midpoint. The spatial angle and the distance to the map midpoint are calculated for each point of the map section. In addition, the time probably needed to reach this point is determined, e.g., in a conventional manner. In so doing, if necessary it is possible to fall back upon navigation system 3, which is usually able to perform calculations of this kind. It is checked whether the point can be represented in the spatially linear scale. If this is the case, the point is represented as in the previous exemplary embodiment. In the example shown, this is the case with point A.

If the point does not fit into the spatial scale area, it is checked whether the point fits into the temporal scale. In the example shown, this is the case for points B and C, since it probably requires less than 15 minutes to reach these points. The position of the point in the area having the temporal scale is calculated. To that end, it is necessary to assign a time to the boundary of the area having the spatially linear scale. That is, in the example shown, it is necessary to calculate how much time is required to reach the 1-km boundary. For instance, average speeds may be used for that purpose. In this case, given an average speed of 60 km/h, for example, the 1-km boundary would be 1 minute away. Moreover, for a road intersecting this boundary, it is possible with the aid of navigation system 3 to calculate the time probably needed to reach the boundary. What matters in this case is less an absolutely exact representation, than rather a fluid representation. Upon crossing this boundary, the points should neither linger for a longer time on the boundary nor jump suddenly. The time required to reach the position of the point influences only the distance of the represented point from the selected map midpoint. The angle with respect to the map midpoint is not changed.

In FIG. 5b, it is discernible that although points B and C have the same linear distance, point C is represented as markedly further away in the map, since it can only be reached via a winding country road (the broken line with FIG. 5a) at lower speed, whereas point B is reached via the expressway.

It should be pointed out that in principle, the boundaries between the individual scales do not have to extend in a circle. Other forms may also be calculated. For example, the boundary lines may extend horizontally.

In an exemplary embodiment, although the map section is represented in a spatial scale, the distance in time between two locations is illustrated via distinguishably represented time zones. For that purpose, the anticipated time intervals to get from the geoposition of the user to the other geopositions represented in the map section are calculated. These time intervals are assigned to a plurality of time zones, and the time zones are represented, for example, in different colors in the map section. Such time zones are shown in FIG. 6. The time zones are differentiated by semitransparent colored surfaces or by contours. Locations which can be reached particularly quickly are within the inner zone. Locations further away in time are in a middle or outer zone. The temporal meaning of the color codings may be indicated by additional markings (e.g., 5 minutes, 10 minutes, etc.). In this context, the time scales are guided by the spatial scale of the map and the settings of the user. It is possible to either display all zones together, or only individual zones such as, for example, the 5-minute zone.

The time zones may be placed over the entire map section, as shown in FIG. 6. In this case, surfaces are generated which are "suspended" with a certain tolerance from points of important roads. For a finite number of roads in the map section, the point which the user is able to reach within the time span of the reachability zone (5 minutes, 10 minutes, etc.) is ascertained, taking fixed standard speeds into account. If desired, the calculation may be performed via navigation system 3, as well. This is done for as many roads as possible, so that ultimately a quantity of limit points exists. These limit points are used as anchor points of an envelope which, for example, defines the 5-minute zone. The limit points are generated in the same manner for other reachability zones as well.

The more limit points it is possible to determine, the more precise the form of the time zone. For a representation with the vehicle in the central position as selected in FIG. 6, an envelope should be suspended from limit points that are distributed as uniformly as possible in all directions. Moreover, the time zones may be made visible only via infrastructure elements. In this case, only the roads and objects are tinted in different colors according to their reachability, but not the entire landscape. The time zones are calculated as described above.

Figure 7:
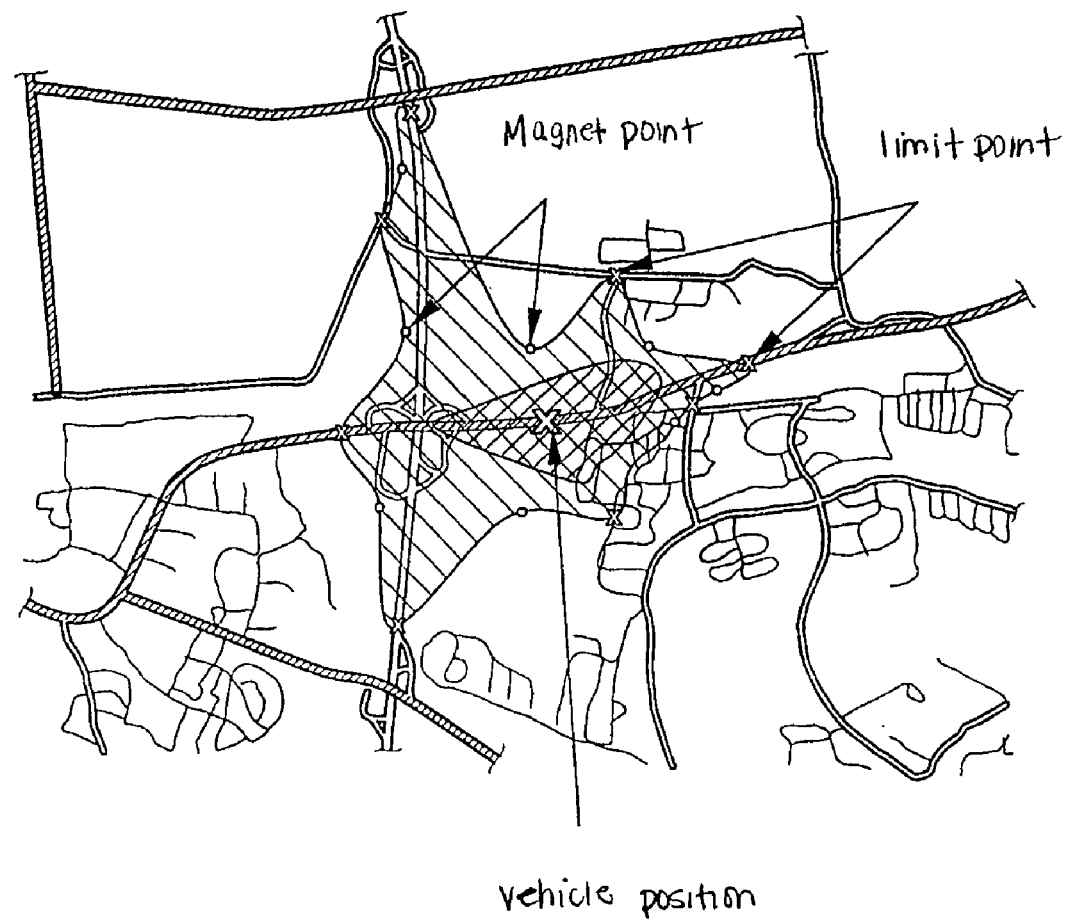
FIG. 7 illustrates the representation of a map section in which different time zones are represented.

Because of the inexactness to be expected due to the deviation of the real traveling speed and traffic situations from the standard speed, the envelope is intended to be only an approximation and not an exact representation. Due to the incompleteness of the anchor points to be expected, the outer edge of the surfaces are interpolated and smoothed to form Bézier curves, so that edges are reduced to a great extent. Between two limit points, a further point, the so-called magnet point, is inserted at the midpoint of the stretch along the envelope. The position of these points shifts in the direction of the vehicle position until, at a fixed distance, it approaches a stretch that theoretically leads to the reaching of one of the limit points. In this manner, an approximation of the real reachability limits already becomes possible using a relatively small number of limit points. The schematic representation of the use of limit points and magnet points is shown in FIG. 7.

According to an exemplary embodiment, a route is displayed in a spatial scale by the navigation system. Furthermore, at least for a portion of the geopositions represented in the map section, for example, for specific points of interest, the anticipated time variance in order to reach these geopositions is calculated. The time variances are assigned to a plurality of time zones here, as well, and the time zones are represented in the map section in a manner distinguishable from one another. The points of interest could also be represented distinguishably in color, so that it is possible to see at a glance how great the detour is in time in order to get to this point of interest.

Prominent geopositions that are not in the map section displayed may be selected and represented at the edge of the map section. In FIG. 6, it can be seen that the abbreviations BS and CF for two cities which lie outside of the map section shown are represented on the horizon according to their relative position with respect to the present direction of travel. The position of these long-distance destinations on the horizon adapts constantly to the relative position with respect to the direction of travel, and therefore shifts along on the horizon in response to a change in the direction of travel, and consequently a rotation of the map section. This manner of representation offers an orientation preview of cities and objects that are in the direction of travel, but are not yet within the map section shown. The long-distance destinations may also be points of interest, the starting point, intermediate destinations or final destinations.

As FIG. 6 shows, the long-distance destinations are always displayed at the intersection between the representation edge and the beeline or straight line between the vehicle and the actual destination. The cities or objects displayed are selected according to their relevance for the route which may have been set and/or according to their distance to the user position. The long-distance destinations are displayed up until they enter into the representation area of the map. Depending upon the scale of the length of the travel route, a special orientation horizon is determined which indicates the distance of a long-distance destination from the location that is the maximum distance at which the display is still warranted. So, for example, given a representation diameter of 5 km, only long-distance destinations are displayed that are no further than 25 km away. This maximum distance increases proportionally to the representation diameter.

In addition, the distance of the long-distance destination from the current location may be imparted in the representation. This is accomplished by scaling the size of an icon assigned to the long-distance destination. The further away the long-distance destination, the smaller the icon. It may also be imparted by a change in the transparency. The further away the long-distance destination, the more transparently or the more similarly to the background color it is represented. The distance may be imparted by a special color coding. Certain colors signify proximity, other colors signify great distance. In addition, the distance in kilometers may be indicated specifically as a script element at the icon.

Moreover, the representation is not limited only to the representation with a horizon. Rather, it may also be transferred to any other map representations, in that the long-distance destinations are already visible along the edges up until their appearance on the representation surface and, so to speak, wait for their entrance into the image area. The display of long-distance destinations permits a wider-ranging orientation which goes beyond the map section displayed.

LIST OF REFERENCE NUMERALS

1 Display device
2 Control unit
3 Navigation system
4 Receiver for satellite signals
5 Preferential geoposition

What is claimed is:
1. A method for controlling display of a geographical map in a vehicle, comprising:

controlling a display device such that a section of the geographical map is displayed in a spatially non-linear scale;
subdividing the map section into at least two areas; and
displaying the two areas in different linear scales.

2. The method according to claim 1, wherein the map section displayed merges continuously at a boundary between the two areas.

3. The method according to claim 1, further comprising:
selecting a preferential geoposition; and
displaying a smaller map scale in a vicinity of the preferential geoposition than in areas remote from the preferential geoposition.

4. The method according to claim 3, wherein the preferential geoposition is a present geoposition of a user ascertained by a navigation system.

5. The method according to claim 3, wherein the preferential geoposition is a geoposition selected via a navigation system.

6. The method according to claim 1, further comprising selecting the map section via a navigation system.

7. The method according to claim 1, further comprising displaying spatial scales which show how far away geopositions are from each other spatially.

8. The method according to claim 1, wherein a boundary line between two areas having representations in different scales is circular.

9. The method according to claim 1, wherein the scale of the map section changes continuously.

10. The method according to claim 1, further comprising displaying at least one of (a) the map section and (b) at least an area of the map section in a logarithmic scale.

11. A method for controlling display of a geographical map in a vehicle, comprising:
controlling a display device such that a section of the geographical map is displayed in a spatially non-linear scale;
calculating an anticipated time to get from one geoposition to another; and
displaying at least one of (a) the map section and (b) at least an area of the map section in a temporal scale in which a time to get from one geoposition to another is represented.

12. The method according to claim 11, further comprising displaying a combination of spatial and temporal scales.

13. The method according to claim 11, wherein an area remote from a present geoposition of a driver is represented in a temporal scale.

14. A method for controlling display of a geographical map in a vehicle, comprising:
controlling a display device such that a section of the geographical map is displayed in a spatially non-linear scale;
calculating anticipated time intervals to get from a geoposition of a user to other geopositions represented in the map section;
assigning the time intervals to a plurality of time zones; and
representing the time zones in the map section in a manner distinguishable from one another.

15. The method according to claim 14, wherein the time zones are coded in color.

16. A method for controlling display of a geographical map in a vehicle, comprising:
controlling a display device such that a section of the geographical map is displayed in a spatially non-linear scale;
calculating an anticipated time variance from a route for at least a portion of geopositions represented in the map section;
assigning the time variances to a plurality of time zones; and
representing the time zones in the map section in a manner distinguishable from one another.

17. A method for controlling display of a geographical map in a vehicle, comprising:
controlling a display device such that a section of the geographical map is displayed in a spatially non-linear scale; and
selecting and representing at an edge of the map section prominent geopositions that are not in the map section displayed.

18. The method according to claim 17, wherein at least one of (a) a size, (b) a transparency and (c) a color of representation of the geopositions represented at the edge of the map section is a function of a distance to a present geoposition of a user.

19. A display apparatus for displaying a geographical map, comprising:
a control unit; and
a display device connected to the control unit configured to display a map section;
wherein the control unit includes an arithmetic-logic unit configured to convert data assigned to the geographical map into display data taking a scale into account;
wherein the scale is spatially non-linear; and
wherein the arithmetic-logic unit is configured to subdivide the map section into at least two areas, and the display data is calculatable with different linear scales for the two areas.

20. The display apparatus according to claim 19, wherein the arithmetic-logic unit is configured to calculate the display data such that the displayed map section merges continuously at a boundary between the two areas.

21. The display apparatus according to claim 19, wherein the scale of the map section changes continuously.

22. The display apparatus according to claim 19, wherein the display device is configured to display at least one of (a) the map section and (b) at least an area of the map section in a logarithmic scale.

23. A navigation system, comprising:
a display apparatus configured to display a geographical map, the display apparatus including:
a control unit; and
a display device connected to the control unit configured to display a map section;
wherein the control unit includes an arithmetic-logic unit configured to convert data assigned to the geographical map into display data taking a scale into account;
wherein the scale is spatially non-linear; and
wherein the arithmetic-logic unit is configured to subdivide the map section into at least two areas, and the display data is calculatable with different linear scales for the two areas.

* * * * *